Sept. 8, 1931.　　　　J. ROUMENS　　　　1,822,824
SHOCK ABSORBING DEVICE
Filed Nov. 13, 1925　　　3 Sheets-Sheet 1
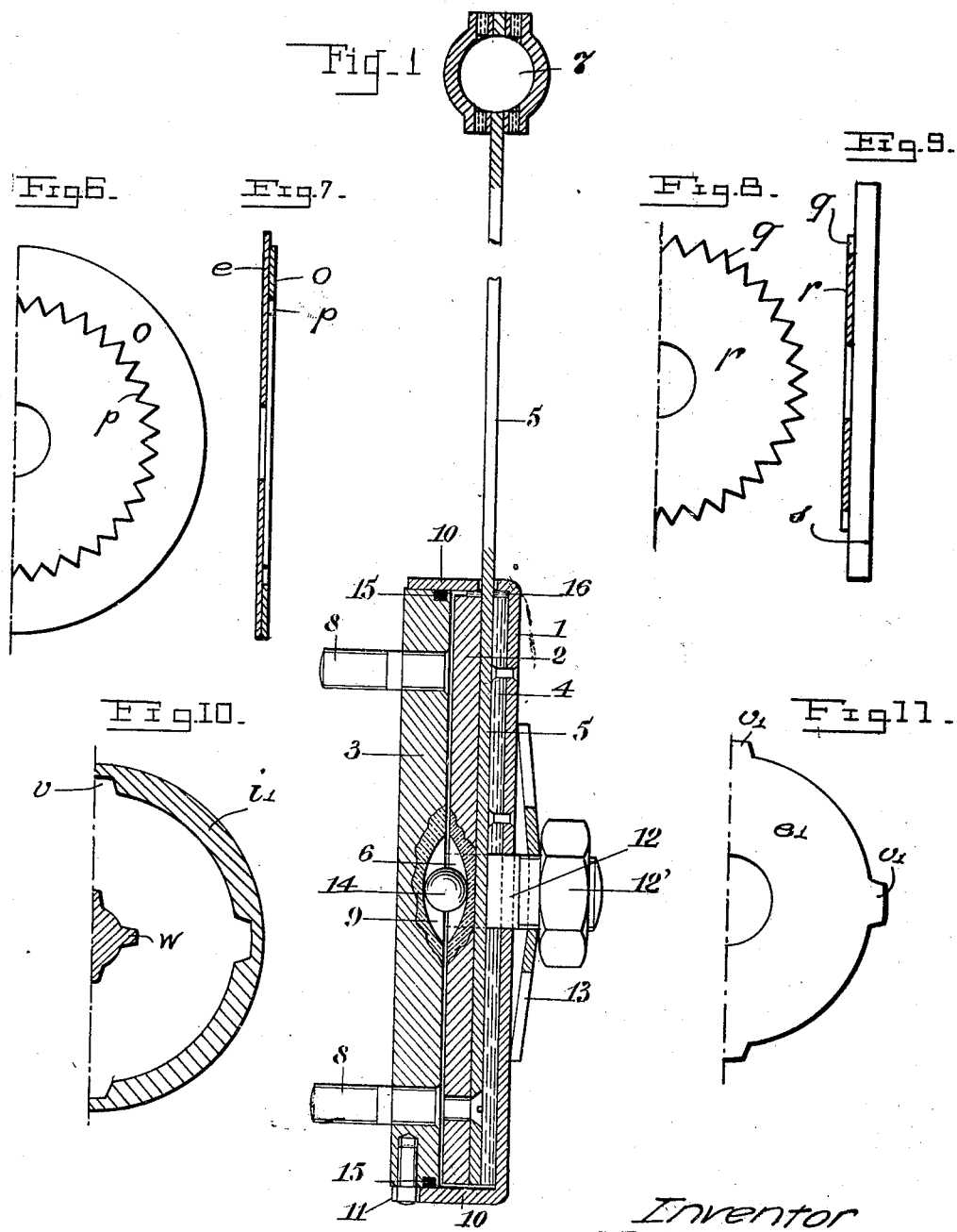

Sept. 8, 1931.  J. ROUMENS  1,822,824
SHOCK ABSORBING DEVICE
Filed Nov. 13, 1925   3 Sheets-Sheet 2
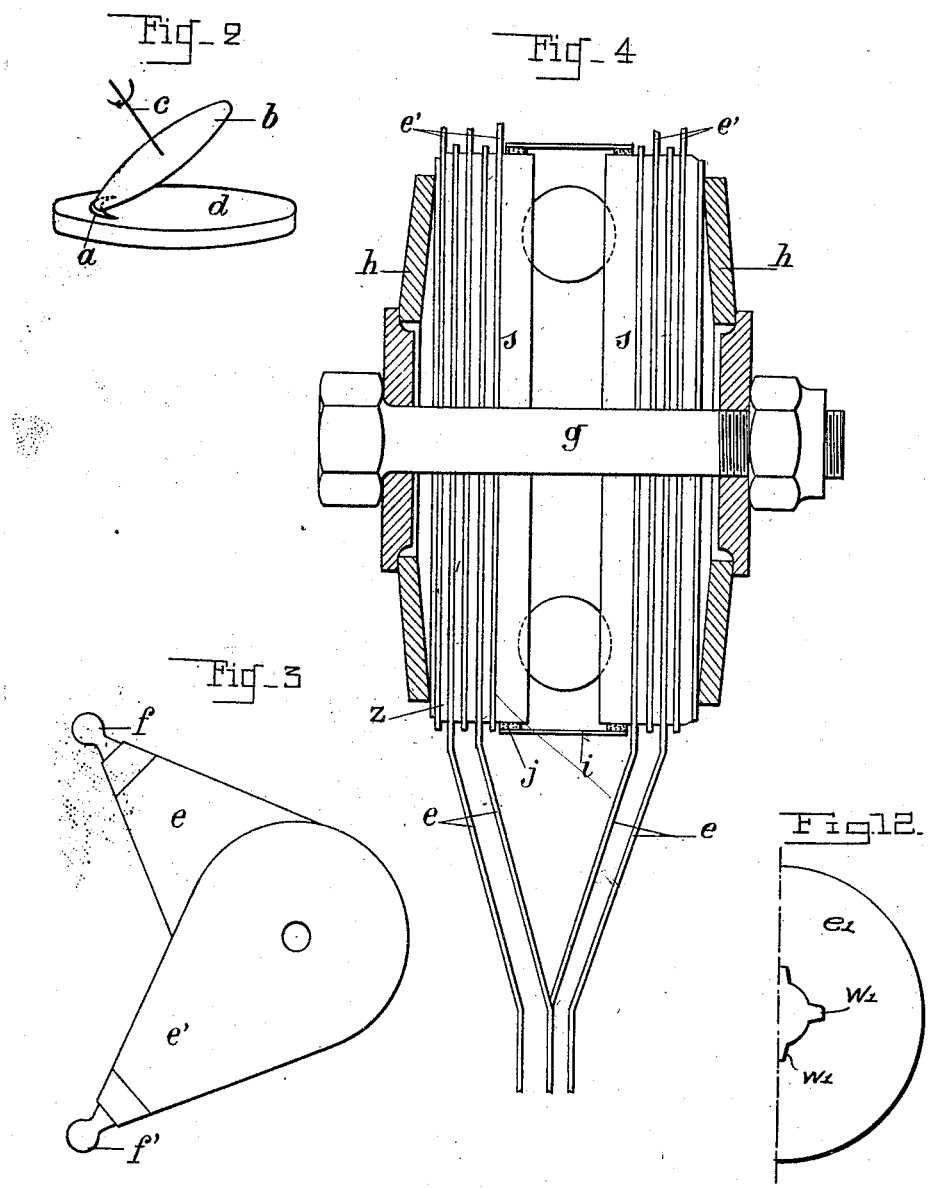

Sept. 8, 1931. J. ROUMENS 1,822,824
SHOCK ABSORBING DEVICE
Filed Nov. 13, 1925   3 Sheets-Sheet 3

Inventor
Jean Roumens
By
Langner, Parry, Card & Langner
Attys

Patented Sept. 8, 1931

1,822,824

UNITED STATES PATENT OFFICE

JEAN ROUMENS, OF PARIS, FRANCE

SHOCK ABSORBING DEVICE

Application filed November 13, 1925, Serial No. 68,890, and in France November 22, 1924.

My invention relates to a damping device for oscillations which is chiefly adapted for combination with springs in such manner as to improve the suspension of vehicles.

The said device essentially comprises the combination of two sets of friction disks which are secured respectively to the vehicle frame and to the axle and are subject to a relative displacement due to the vertical movements of the vehicle. I may optionally interpose between the said disks any suitable material having a high friction coefficient such as fibre to augment the effect of friction. In the mean position of the apparatus, the two sets of disks are only in light contact, but when the axle rises or descends relatively to the vehicle frame, said disks will enter into close contact by means of balls, rollers or the like in co-operation with suitable ramps, thus pressing the parts more strongly together according as the movement of the axle with respect to the vehicle frame is greater, whether the said axle approaches or recedes from the said frame.

The said ramps may have the form of recesses in a suitable disk. Two such disks may be placed together with their recesses in coincidence, and I may place a ball in each pair of recesses whereby the said disks will be properly separated. Due to the relative movements of the said disks, the position of the balls in the recesses will be changed whereby a different spacing of said disks will result.

In the first modified construction, the first recessed disk is mounted upon the elements secured to the axle by a lever whose rotation separates the disks and presses the friction surfaces together. I prefer to give the said recesses the shape of a tore whose axis meets the axis of the disk and makes a suitable angle therewith. The said recess may be formed by means of a milling cutter whose operative part has the form of a tore and whose axis is inclined from the axis of the disk. The said disk may also be mounted in an inclined position on a lathe, and the cutting tool will thus form the annular recess.

The aforesaid shape of recess is applicable to all modifications of my said apparatus.

In a second modification, recessed disks are secured respectively to the vehicle frame and axle by suitable arms, as in the known scissors type of shock absorber, one arm being secured to a set of disks cooperating with a set of disks secured to the other arm. Suitable facings consisting of fibre or other friction material are placed between the said disks. The whole set of disks is traversed by a bolt provided with concave spring washers or suitable springs whereby the device may be pressed together.

I prefer to employ instead of the said bolt a hollow rod having a screw plug at each end. One plug may be provided with a lubricating cup; the said rod may be apertured for the suitable oiling of the several recessed disks.

The third modification relates to a device wherein one of the recessed disks is rigidly secured to the vehicle body or to the axle, the other disk being connected by an arm and a pivot joint to the axle or the vehicle body. The disks which are secured to the said stationary disk carry projections engaging in slots in the casing whereby they are held in place; the disks secured to the movable disk have notches in which is engaged a long key are secured to the axis of the said movable arm.

The following description with reference to the appended drawings sets forth various embodiments of the invention.

Fig. 1 is a sectional view of an embodiment, with parts broken away, and,

Fig. 2 is a perspective view showing the machine operation for forming the recesses.

Fig. 3 is a diagrammatic view of a shock absorber with two arms, of the scissors type.

Fig. 4 is an axial section of the second modification.

Figs. 6, 7, 8 and 9 are respectively elevational and sectional views of the male and female parts of a tooth-fitted device for the adjustment of the initial position of the arms.

Figure 5:
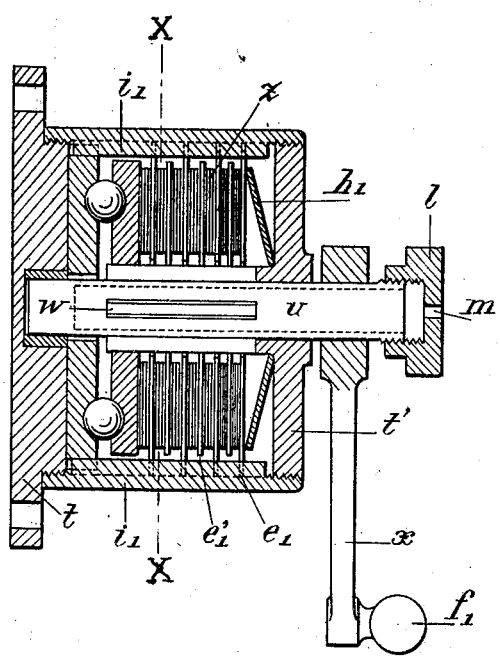
Fig. 5 is an axial section of an axial lubricating rod.

Fig. 10 a section on the line X—X of Fig. 5, and

Figs. 11 and 12 show cheeks pertaining to this device.

In the construction shown in Fig. 1, the device comprises a set of movable parts connected with the axle and a set of stationary parts connected with the vehicle body. The movable parts comprise a circular disk 2 in which are formed a certain number of recesses 6; to the said disk is secured a lever arm 5 having at the end a joint 7 by which it is connected with the vehicle axle.

The stationary parts comprise a disk 3 which is suitably secured to the vehicle frame, for instance by bolts 8, and comprises the recesses 9 co-operating with the recesses 6 of the disk 2. A second disk 1 is employed which comprises the annular flange 10 and forms so to speak the cover of a box whose bottom is represented by the disk 3; the disk 1 is held against rotation relatively to the disk 3 by the guiding studs 11, or by like means, but it may move from or towards the disk 3, in the direction of the main centre line of the device. The inner surface of the disk 1 is faced with fibre 4 or other substance of highly frictional coefficiency. The device further comprises a central bolt 12 whose shank is mounted on the disk 3, and a spring washer 13 placed between the nut 12′ and the disk 1. In the recesses 6 and 9 of the respective disks 2 and 3 are disposed the balls 14.

The operation of the said device is as follows:

When the vehicle axle is in the middle position relatively to the vehicle frame, the recesses 6 will exactly coincide with the recesses 9; the balls 14 will be situated upon their common axis, and the space between the disks 2 and 3 will now be very small, so that the friction between the contacted surfaces of the lever 5 and of the fibre disk 4 fixed on the disk 1 is a minimum, its value depending upon the initial compression given to the spring washer 13 placed between the nut 12′ and the cover 1.

When the position of the axle relatively to the vehicle frame is changed due to the conditions of the road, the arm 5 will describe a circular arc, thus actuating the disk 2, so that the points of contact between said balls and recesses will be modified; the distance between the disks 2 and 3 will increase, and the washer 13 will be subjected to a compression depending upon the displacement of the axle relatively to the vehicle frame. The amount of friction between the contacted surfaces of the lever 5 and of the fibre disk 4 fixed on the disk 1 will vary in like manner. The result will be a progressive damping of the oscillations.

The friction corresponding to the position of coincidence of said recesses may be made as small as possible, so that for small oscillations the action of the device will be negligible, and the suspension qualities of the vehicle will remain unchanged.

The mean position of the two surfaces corresponds to a stated load on the vehicle. Any change in this load will modify the relative position of the axle and frame, and this will change the relative position of the surfaces and hence the amount of friction. The friction will thus vary with the degree of the oscillations and with the load upon the vehicle.

It should be further noted that the whole device constitutes a closed case. The device is closed against foreign bodies by means of the circular packing member 15 and the small washer 16 which is secured to and moves with the lever 5. The wear may be taken up by tightening the nut 12′.

Fig. 2 shows a form of recess which may be employed, and the position of the milling cutter producing the said recess. Herein the recess has the form of a circular groove $a$ of stated length whose greatest depth is in the middle. The milling cutter is represented diagrammatically by the line $b$ of its cutting parts. The said cutter rotates on the axis $c$ which makes a certain angle with the axis of the disk $d$. I form each recess by bringing the disk below the cutter and gradually raising the disk until the proper depth of cut has been obtained. The several recesses can be thus cut in the disk in a rapid manner and by a simple operation.

In a modified form of the apparatus (Figs. 3 and 4) I provide two arms $e$ and $e'$ which preferably consist of a set of plates having faces at whose ends are disposed suitable pivot elements consisting for example of the ball portions $f$ and $f'$ forming ball-and-socket joints upon the vehicle frame and the axle.

I provide the said plates in any suitable number, according to the power of the vehicle employing the shock absorber, and I prefer to employ plates whose total number is an odd number, so as to obviate all improper loosening of the nut of the bolt $g$, since when an odd number of plates is used, the end plates act together, either remaining fixed or moving according to the relative coefficient of friction between the end plates and the fixed structure against which they abut, and between the plates of the two groups. There is a good chance that they will remain stationary, movement being confined entirely to the other set of plates so that the end plates will act as washers, relieving the nuts from turning stress. If an even set of plates is used, there must inevitably be rotation between the end plates, so that rotation may thereby be communicated directly to the nuts. Between said cheeks are disposed friction washers $z$ and the friction will be proportional to the effort of the spring washers $h$ or to suitable springs maintained by the bolt $g$. The internal parts of said device are protected against dust and grit, or like effects, by a cylinder $i$ of metal or other substance which is lined with felt, leather or like substance.

The central bolt $g$ may be replaced to advantage by a hollow rod $k$ having the plugs $l$ at each end (Fig. 5); the rod or tube $k$, which may have a considerable diameter, is provided with orifices $n$ for lubricating certain of the parts and chiefly the washers $z$. In the plug which is provided a lubricating orifice $m$ and even a suitable oiler (not shown) may be mounted thereon.

The said hollow rod offers various advantages. It enables the ready lubrication of the device, and by its use apparatus is lightened, this being more apparent as the diameter increases; also, the wear of the friction surfaces is reasonably uniform. Since the wear is a maximum at the periphery, at which the relative periphery speed of the moving surfaces is greatest, the efficiency of the device is not much reduced by increasing the diameter of the cylinder $k$, and the wear will thus be better distributed upon the friction washers.

In the second modification (Figs. 10 to 12) I employ a device which is rigidly secured to the vehicle frame or to the axle through the medium of the plate $t$ including the lever $x$ keyed to the shaft $u$ and of the ball-and-socket joint $f_1$; the device is connected with the vehicle axle by the known means i. e. an adjustable rod with ball-and-socket joint.

In this form of the invention said plates are alternately disposed in such manner that the plates $e'_1$ are secured to the shaft $u$, and the plates $e_1$ are secured to the casing $i_1$. For this purpose, the plates $e'_1$ comprise the internal notches $w_1$ co-operating with the long keys $w$ whereby the said plates are secured to the shaft; the plates $e_1$ are provided at the periphery with the projections $v_1$ co-operating with slots $v$ in the outer casing. The plates $e_1$ and $e'_1$ and the facings $z$ which are secured to the plates of one or the other groups are pressed together by a spring washer $h_1$ or by springs which abut against the cover $t'$.

The position of the plates $e$ $e'$ and $x$ must be so regulated that the said balls will be at the middle of their recesses when the vehicle frame is in the middle position. For this purpose I may place between the washers and the said arms any suitable connecting device. In particular, I may employ a toothed connection (Figs. 6 to 9) which pertains chiefly to the first modification. Upon the plate $e'$ is mounted a ring $o$ carrying the internal teeth $p$. The recessed disk $s$ to which is adjustably secured the plate $e'$ is provided with a disk $r$ of smaller diameter whose external teeth $q$ co-operated exactly with the teeth $p$ of the ring $o$. In this manner the initial position of the plate $e'$ relatively to the disk $s$ may be regulated by reason of the said co-operation. The object of this toothed connection is initially to set the confronting members having the curved recesses, so that said recesses will bear the desired advantages relative one to another. For instance, referring to Figure 5, the plate $e'$ is held by the chassis engaging member while the opposite member $s$ belongs to the unit which oscillates with the spring and carries one set of the curved recesses. The intermediate member $s$ carries the other set of curved recesses and is made adjustable with respect to the plate $e'$ by means of the external teeth $q$ with which it is provided and which intermesh with internal teeth $p$ formed on the plate $e'$. These two sets of teeth are kept intermeshed by pressure of the spring $h'$ at the left hand end of the device as shown in Figure 5. Thus a definite relation exists between the two members $s$ in the normal inactive state of the shock absorber. If another definite relation is desired, the interleaved plates are pushed back against the spring $h'$ enough to permit the intermediate member $s$ to be unmeshed from the teeth of the adjacent member $e'$ and be rotated slightly so as to obtain a new intermeshing relation with said plate $e'$. The spring $h'$ is then again permitted to act on the parts, holding the plate $e'$ and the adjacent intermediate member $s$ in unitary relation.

Having now described and ascertained my invention and in what manner the same is to be performed I claim:

1. In a shock absorber designed to be placed between the chassis and the axle in auto vehicles, means affording surfaces of friction, arranged in relatively movable frictional engaging groups, one associated with the chassis and the other with the axle, means for applying yielding pressure to said friction surfaces of greater value as said spring and axle recede in one direction and the other from their position of repose, said means consisting of balls interposed between two ramps with which said groups of friction surfaces are respectively provided.

2. In a shock absorber as claimed in claim 1, the respective groups of friction surfaces being provided with disks, said disks being formed with curved recesses, and rolling devices arranged in said recesses.

3. In a shock absorber as claimed in claim 1, the respective groups of friction surfaces being provided with confronting disks, said disks being formed with curved recesses of symmetrical incurved contour, balls arranged in said curved recesses, and being normally in the median enlarged parts of said recesses in a mean relative position of said groups of friction surfaces.

4. In a shock absorber as claimed in claim 1, said groups of friction surfaces being provided respectively with members having ramps, rolling devices in said ramps, a hollow shaft passing through the interior parts of said friction surfaces and said ramp-carrying members and opening through said shaft to said ramps for assuring the lubrication of said shock absorber.

5. In a shock absorber as claimed in claim 1, the respective groups of interengaging friction surfaces being provided with members having ramps, rolling devices in said ramps, a hollow shaft passing through the interior of said friction surfaces and ramp-carrying members, abutments on said shaft and a spring between said friction surfaces and abutments biasing said groups of friction surfaces into engagement.

6. In a shock absorber as claimed in claim 1, a casing, grooves in the periphery of said casing, one group of friction surfaces being provided with tenons engaging in said grooves, a shaft passing through the interior part of said first group of friction surfaces, a spline on said shaft, the second group of friction surfaces being arranged in alternating relation to said first group and having recesses which pass over said spline, disks on said shaft movable with the respective groups of friction surfaces, curved recesses formed on said disks and rolling devices within such recesses, displaceable relative to said ramps for spreading said disks and forcing said interengageable friction surfaces into intimate contact.

7. In a shock absorber as claimed in claim 1, a toothed coupling between the ramp-carrying members for adjustably determining the normal relative positions thereof.

In testimony whereof I have signed my name to this specification.

JEAN ROUMENS.